United States Patent
Mogre et al.

[11] Patent Number: 6,122,325
[45] Date of Patent: Sep. 19, 2000

[54] METHOD AND SYSTEM FOR DETECTING AND CORRECTING IN-PHASE/QUADRATURE IMBALANCE IN DIGITAL COMMUNICATION RECEIVERS

[75] Inventors: Advait M. Mogre; Dariush Dabiri, both of Fremont; Shobana Swamy, Milpitas; Qian Cheng, Santa Clara, all of Calif.

[73] Assignee: LSI Logic Corporation, Milpitas, Calif.

[21] Appl. No.: 09/018,602

[22] Filed: Feb. 4, 1998

[51] Int. Cl.$^7$ ........................................... H04L 5/12
[52] U.S. Cl. ........................ 375/261; 375/235; 375/349; 375/268
[58] Field of Search ........................ 375/316, 235, 375/261, 268, 285, 279, 345, 346, 284, 349, 329, 317; 329/304; 455/161.1, 161.2, 226.3

[56] References Cited

U.S. PATENT DOCUMENTS

| | | | |
|---|---|---|---|
| 5,263,196 | 11/1993 | Jasper | 455/324 |
| 5,369,411 | 11/1994 | Lisle, Jr. | 342/194 |
| 5,699,383 | 12/1997 | Ichiyoshi | 375/297 |
| 5,705,949 | 1/1998 | Alelyumas et al. | 329/304 |
| 5,870,439 | 2/1999 | Ben-Efraim et al. | 375/346 |
| 5,872,538 | 2/1999 | Fowler | 342/194 |
| 5,937,341 | 8/1999 | Suominen | 455/324 |
| 5,949,821 | 9/1999 | Emami et al. | 375/235 |
| 6,009,317 | 12/1999 | Wynn | 455/296 |

*Primary Examiner*—Chi H. Pham
*Assistant Examiner*—Emmanuel Bayard
*Attorney, Agent, or Firm*—D'Alessandro & Ritchie

[57] ABSTRACT

The invention provides a method and system for correcting imbalance in in-phase and quadrature components of a modulated received signal. The method includes assuming a signal imbalance to exist in the received signal, the signal imbalance having an amplitude imbalance and a phase imbalance, generating an amplitude imbalance correction factor and a phase imbalance correction factor to lessen the signal imbalance, and re-evaluating the amplitude and phase imbalance correction factors over a set of readings of the in-phase and quadrature components until the signal imbalance is minimized.

12 Claims, 5 Drawing Sheets

METHOD AND SYSTEM FOR DETECTING AND CORRECTING IN-PHASE/QUADRATURE IMBALANCE IN DIGITAL COMMUNICATION RECEIVERS

BACKGROUND OF THE INVENTION

1. Field of the Invention

The present invention relates to a method and system for detecting and correcting in-phase/quadrature imbalance in digital communication receivers. More particularly, the invention relates to a method for detecting and correcting amplitude and phase imbalance using simulation models.

2. The Background Art

A receiver is used to reprocess signal data received from a channel through undoing signal modifications made at the transmitter and the channel. Typically, the signal is distorted by the channel, as well as by internal and external causes. This distortion may be represented by a signal-to-noise ratio (SNR) defined as the ratio of the signal power to the noise power.

A modulated signal includes an in-phase component and a quadrature component. When the modulated signal is received, after conversion from an analog to a digital signal using an analog-to-digital converter, each bit is demodulated into the in-phase and quadrature signal components using sine and cosine functions. Typically, there is an amount of deviation in the proper alignment of the in-phase and quadrature components of the modulated received signal. This deviation may occur in both the amplitude and the phase of the in-phase and quadrature components of the signal. Moreover, imbalance is typically introduced by a tuner when the signal is received.

When a channel is changed or a channel is newly acquired, correction of signal imbalance is desirable. Typically, correction of the amplitude and phase imbalance is handled by hardware. For example, an equalizer may be used to correct interference present in the received signal. However, equalizers are expensive and not typically required to correct noise present in satellite receiving systems. A need exists for a method and system for first detecting and then correcting imbalance in the in-phase and quadrature signal components which may be implemented in software, significantly reducing the costs of such a system. Through the use of such a system, correction of imbalance may be performed off-line as the signal is being viewed.

BRIEF DESCRIPTION OF THE INVENTION

The present invention provides a method and system for correcting imbalance in in-phase and quadrature components of a modulated received signal. A signal imbalance is assumed to exist in the received signal, the signal imbalance having an amplitude imbalance component and a phase imbalance component. An amplitude imbalance correction factor and a phase imbalance correction factor are then generated to lessen the signal imbalance. The amplitude and phase imbalance correction factors are then re-evaluated over a set of readings derived from the processing of the in-phase and quadrature components until the signal imbalance is minimized.

According to the present invention, correction of phase and amplitude imbalance for in-phase and quadrature components may be achieved through a combined amplitude and phase correction model. This amplitude and phase correction model includes an amplitude imbalance correction factor and a phase imbalance correction factor. Initially, specific amplitude imbalance a and phase imbalance $\phi$ in the received signal are assumed. An initial amplitude imbalance correction factor $\alpha$ and phase imbalance correction factor $\beta$ corresponding to the assumed imbalances are calculated. More accurate correction factors are derived from power variance values obtained over subsequent readings of the in-phase and quadrature signal components obtained at the matched filter outputs. Combined correction of these imbalances may then be achieved through application of calculated values of the correction factors. Corrected in-phase and quadrature signal values may then be derived the combined amplitude and phase correction model using these values of $\alpha$ and $\beta$.

Thus, through use of the present invention, improved performance may be achieved with an existing tuner. Since the present invention is implemented in software, hardware costs are substantially reduced. Moreover, the present invention may be used with a less costly tuner, further reducing the costs of a satellite receiver system.

DETAILED DESCRIPTION OF THE PREFERRED EMBODIMENTS

In the following description, a preferred embodiment of the invention is described with regard to preferred process steps and data structures. However, those skilled in the art would recognize, after perusal of this application, that embodiments of the invention may be implemented using a set of general purpose computers operating under program control, and that modification of a set of general purpose computers to implement the process steps and data structures described herein would not require undue invention.

The present invention provides a method and system for detecting and reducing the imbalance present in the in-phase and quadrature signal components of a modulated received signal. In this manner, the present invention compensates for possible imbalances present in digital communication receiver systems. This method may be implemented in software or firmware, as well as in programmable gate array devices, ASIC and other hardware.

Figure 1:
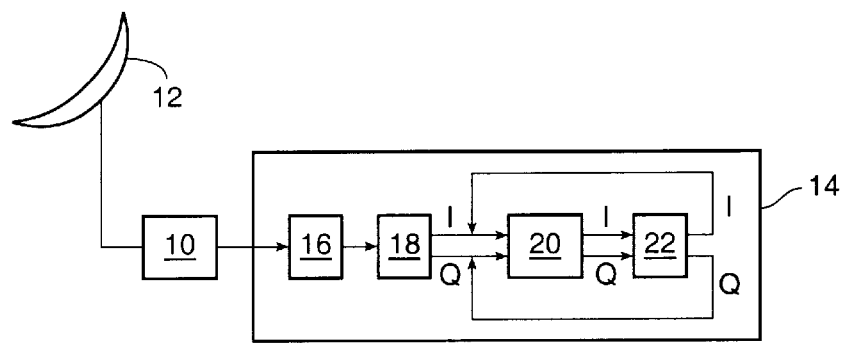
FIG. 1 illustrates a system for receiving data from a satellite according to a presently preferred embodiment of the present invention.

Referring first to FIG. 1, a system for receiving data from a satellite according to a presently preferred embodiment of the present invention is illustrated. As shown in FIG. 1, a tuner 10 receives data from a RF satellite channel 12. The data is then processed by a binary phase-shift keying (BPSK) or quadrature phase-shift keying (QPSK) demodulator 14 having a physical interface 16 and an A/D converter 18. Thus, the demodulator 14 extracts a digital signal from a modulated analog signal. The demodulator 14 further comprises a matched filter 20 which includes an in-phase output (I) and quadrature output (Q). Matched filters are typically used to maximize the signal-to-noise amplitude ratio. Since variance is most easily extracted at the matched filter outputs, the present invention 22 is operatively coupled to the matched filter 20 outputs. Thus, the present invention 22 detects and corrects any imbalance in the amplitude and phase of the in-phase and quadrature signal components read at the outputs.

Figure 2:
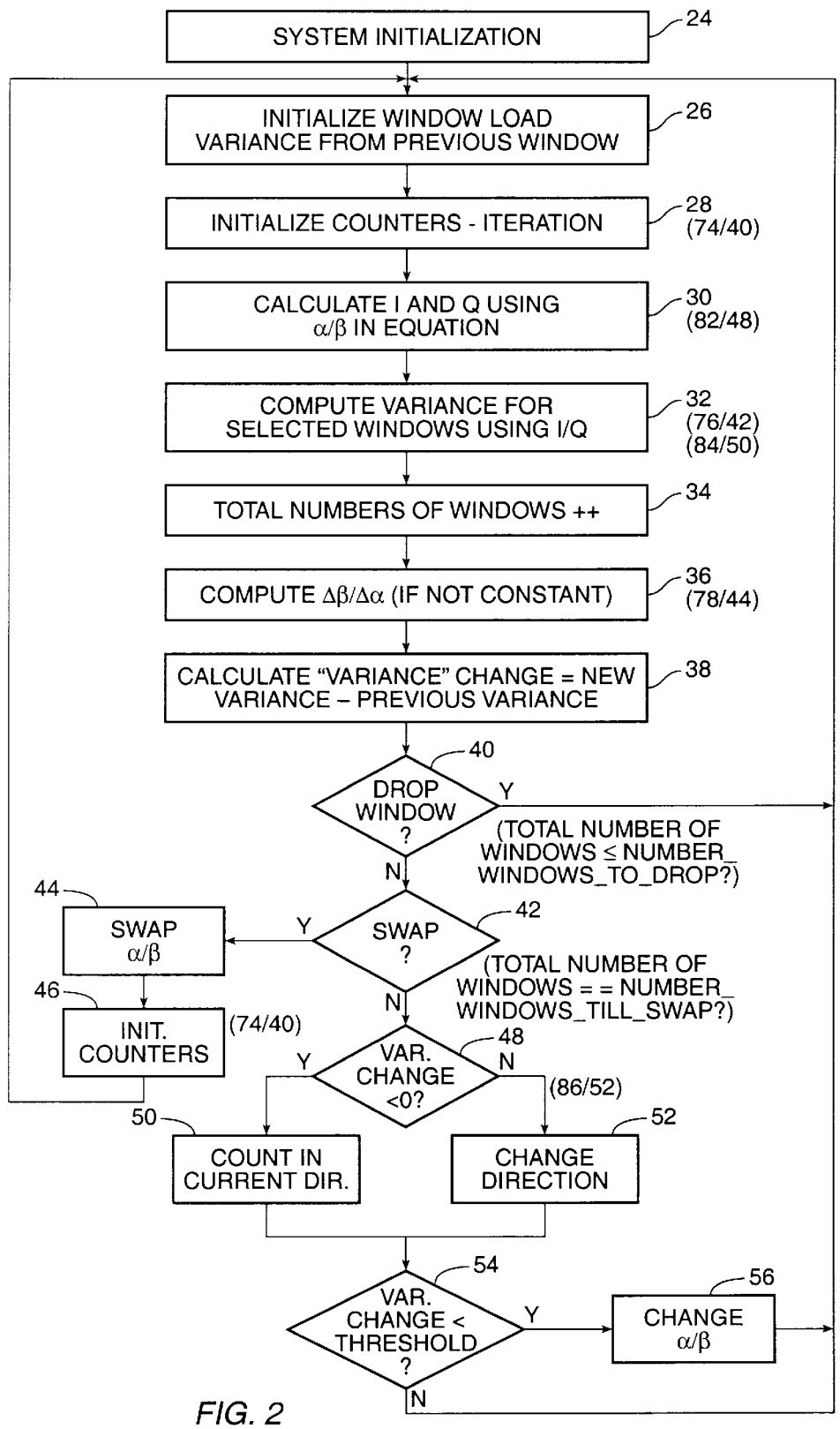
FIG. 2 illustrates a method for detecting and correcting amplitude and phase imbalance of in-phase and quadrature signal components.

Referring now to FIG. 2, a method for detecting and correcting amplitude and phase imbalance of in-phase and quadrature signal components is presented. Correction of phase and amplitude imbalance for in-phase and quadrature components may be achieved through a combined amplitude and phase correction model:

$$\begin{bmatrix} I \\ Q \end{bmatrix}_{out} = \begin{bmatrix} 1 & \beta \\ 0 & \alpha \end{bmatrix} \begin{bmatrix} I \\ Q \end{bmatrix}_{in} = \begin{bmatrix} 1 & -\frac{1-a}{1+a}\sin 2\varphi \\ 0 & \frac{1-a}{1+a}\cos 2\varphi \end{bmatrix} \begin{bmatrix} I \\ Q \end{bmatrix}_{in}$$

where a represents amplitude imbalance and $\phi$ represents phase imbalance. Initially, specific phase imbalance a and amplitude imbalance $\phi$ in the received signal are assumed. Combined correction of these imbalances may then be achieved through application of calculated values of an amplitude correction factor $\alpha$ and a phase correction factor $\beta$. The in-phase and quadrature signal values may then be derived from the combined amplitude and phase correction model using these values of $\alpha$ and $\beta$.

As shown in FIG. 2, a method for calculation of correction factors $\alpha$ and $\beta$ to correct phase and amplitude imbalance in the tuner is presented. Once calculated, these constants $\alpha$ and $\beta$ are used for calibration of the tuner. First, at step 24, the system is initialized. Next, at step 26, a window is initialized. As defined herein, a window is defined by a specified number of matched filter output readings. Initialization occurs when the variance value from the previous window is loaded. At step 28, initialization of counters is performed. For example, an ITERATION flag is initialized to 1, indicating that the first iteration of the process is being performed. Next, at step 30, updated in-phase (I) and quadrature (Q) component signal values corresponding to the new ALPHA value are obtained using the combined amplitude and phase correction model. The corrected values of the in-phase and quadrature signal components are then provided via a feedback loop at the outputs of the A/D converter. Next, at step 32, the variance of the power is computed from a signal to noise ratio computation at the matched filter outputs. The TOTAL_NUMBER_OF_WINDOWS is increased at step 34.

Next, at step 36, DELTA_ALPHA corresponding to the amplitude imbalance is determined. According to a first preferred embodiment, the DELTA VALUE, DELTA_ALPHA or DELTA_BETA, corresponding to the phase imbalance is computed as a proportion of the variance. For example, a previously determined constant mu_ALPHA/mu_BETA is assumed. Then, mu_ALPHA/mu_BETA is multiplied by the variance, SUM, to produce DELTA_ALPHA/DELTA_BETA. Thus, since the variance changes, DELTA_ALPHA/DELTA_BETA is not constant. According to a second preferred embodiment, DELTA_ALPHA/DELTA_BETA is assumed to be a constant which is a proportion of the variance, which is initialized during system initialization. In this manner, a minimum with respect to the ALPHA/BETA value is reached in a more efficient manner. However, the value will not be as accurate as that achieved with the first preferred embodiment.

Next, at step 38, the variance change equal to the difference between the new variance and the previous variance is calculated. According to a presently preferred embodiment, the previous variance is subtracted from the new variance. Next, at step 40, the window calculations are "dropped", or ignored, where the calculations are inaccurate. According to a presently preferred embodiment, this will occur during the first two windows, since at least two iterations are required to obtain a variance change. Thus, when the TOTAL_NUMBER_OF_WINDOWS<=NUMBER_WINDOWS_TO_DROP, the window is dropped and the process continues at step 26. However, if the TOTAL_NUMBER_OF_WINDOWS>NUMBER_WINDOWS_TO_DROP, the process continues at step 42. At step 42, the correction factor is swapped after a predetermined number of windows. According to a presently preferred embodiment, when TOTAL_NUMBER_OF_WINDOWS is equal to the NUMBER_WINDOWS_TILL_SWAP, the correction factor is swapped at step 44, and either the ALPHA value corresponding to the phase imbalance a or the BETA value corresponding to the amplitude imbalance $\phi$ is chosen to be modified. For example, if the correction factor is ALPHA, the correction factor BETA is then corrected at step 44. Alternatively, if the correction factor is BETA, the correction factor ALPHA is corrected. The counters are initialized at step 46, and the process proceeds at step 26.

At step 48, if the change in variance is less than zero, the amplitude imbalance continues in the same direction at step 50 and the ITERATION is increased. However, if at step 52, the change in variance is greater or equal to 0, the direction of correction factor modification is changed. Next, at step 54, if the variance change is less than a predetermined threshold value, the process continues at step 26. However, if at step 54 it is determined that the variance change is not less than the threshold value, the appropriate correction factor, ALPHA or BETA, is updated to reflect the DELTA value at step 56. This accomodates for inherent fluctuation in invariancy calculation. According to a preferred embodiment, the threshold value is determined for a particular window size and defined in a table. The above steps may be performed on a continuous basis, as shown, in order to monitor changes in the amplitude and phase imbalance. Alternatively, calibration may be performed for a limited period of time.

Figure 3:
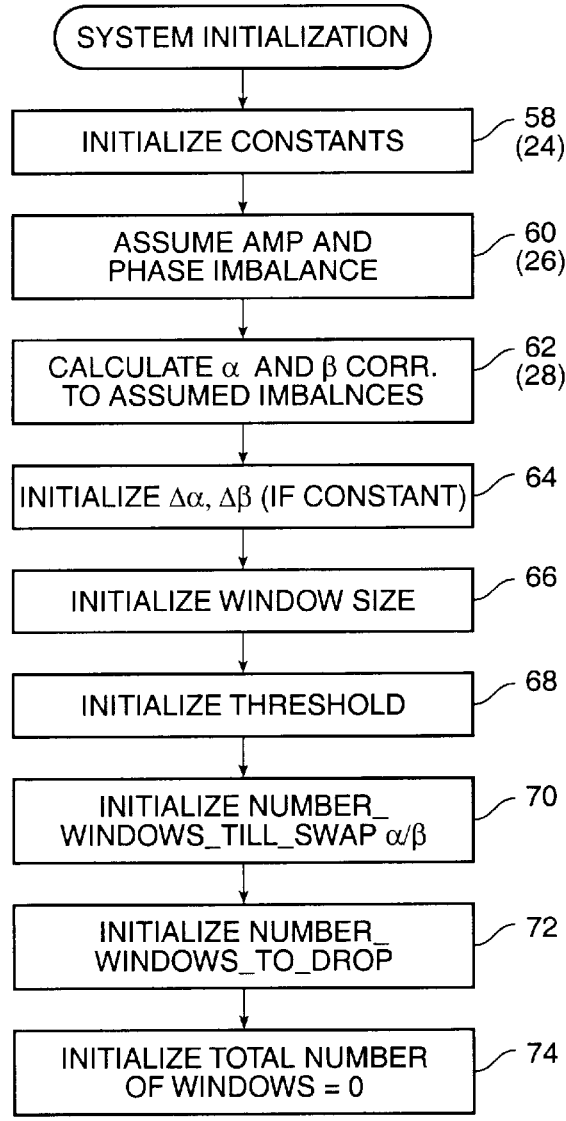
FIG. 3 is a flow diagram illustrating system initialization according to FIG. 2 according to a presently preferred embodiment of the present invention.

Referring now to FIG. 3, system initialization according to FIG. 2 is performed according to a presently preferred embodiment of the present invention. At step 58, constants are initialized. For example, constant POWER_REFERENCE is initialized for a given AUTOMATIC_GAIN_CONTROL setting based on system considerations. The Automatic Gain Control (AGC) circuit is designed to keep the input signal range constant over a wide range of signal to noise ratio values. According to a presently preferred embodiment of the present invention, these constants may be initialized by a user at start-up. For example, the POWER_REFERENCE may be computed through the following formula: POWER_REFERENCE=$(I^2+Q^2)^{1/2}$. Next, at step 60, a phase imbalance $\phi$ and amplitude imbalance a are assumed to be present in the received signal. According to a presently preferred embodiment of the present invention, under ideal conditions, no imbalance exists. Thus, these imbalances are initially set to 0. Next, at step 62, a corresponding ALPHA and BETA value are calculated according to correction factor equations $$\alpha = \frac{1-a}{1+a}\cos 2\varphi$$

and $$\beta = -\frac{1-a}{1+a}\sin 2\varphi.$$

At step 64, DELTA values DELTA ALPHA and DELTA BETA are initialized, if constant. Next, at step 66, the window size defining the number of points obtained through matched filter readings is set. Next, at step 68, the threshold value is initialized. This may be performed for various window sizes through use of a table. At step 70, the NUMBER_OF_WINDOWS_TILL_SWAP is defined to allow alternate updating of both correction factors. Thus, for a specified number of windows, one correction factor is updated. At step 72, the NUMBER_OF_WINDOWS_TO_DROP is defined. According to a preferred embodiment, the NUMBER_OF_WINDOWS_TO_DROP is two, allowing for a first iteration to obtain a variance value, and a second iteration to obtain a change in variance. Next, the TOTAL_NUMBER_OF_WINDOWS is initialized to zero at step 74.

Figure 4:
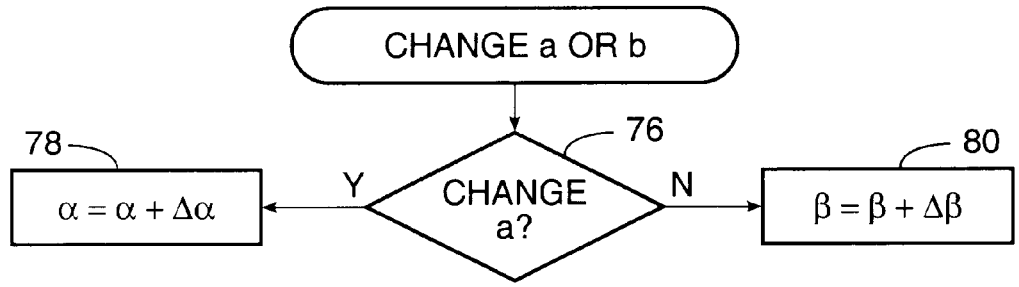
FIG. 4 illustrates a method for changing the correction factor, ALPHA or BETA, according to a presently preferred embodiment of the present invention.

Referring now to FIG. 4, a method for changing the correction factor, ALPHA or BETA, according to a presently preferred embodiment of the present invention is illustrated. If it is determined at step 76 that ALPHA is changed, DELTA_ALPHA is added to the previous ALPHA value at step 78. However, if BETA is changed, DELTA_BETA is added to the previous BETA value at step 80.

Figure 5:
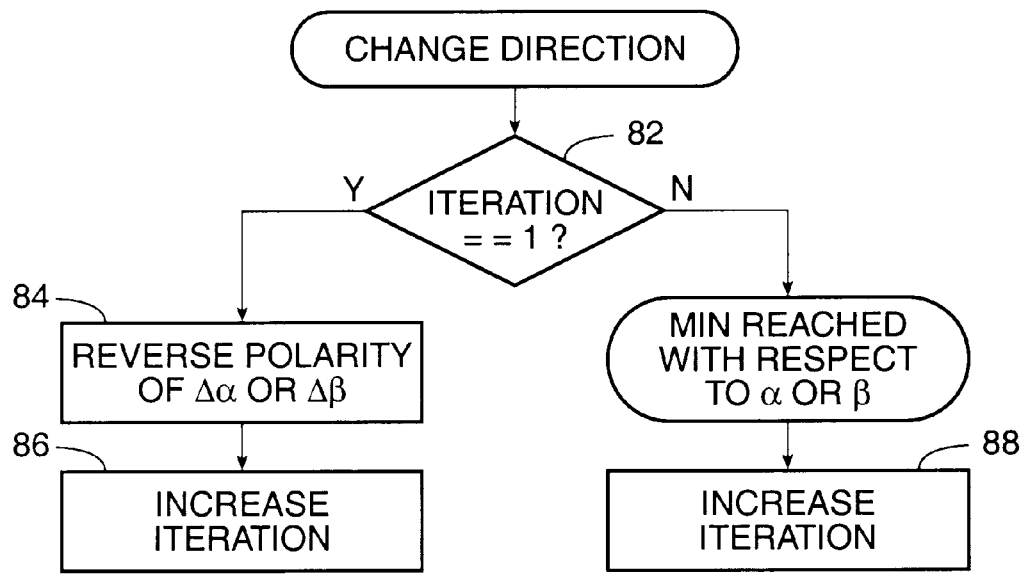
FIG. 5 illustrates a method for changing the direction of correction factor adjustment of FIG. 2 according to a presently preferred embodiment.

Referring now to FIG. 5, a method for changing the direction of correction factor adjustment of FIG. 2 according to a presently preferred embodiment is presented. At step 82, if the ITERATION flag is determined to be equal to 1, then the polarity of DELTA_ALPHA is reversed at step 84. At step 86, the ITERATION flag is increased, and the process continues at step 54. However, if at step 82, the ITERATION flag is determined not to be equal to 1, the correction process is determined to be completed when a minimum with respect to the correction factor, ALPHA, has been reached. The ITERATION is then increased at step 88.

The correction process is determined to be completed when a minimum with respect to that parameter has been reached. According to a presently preferred embodiment of the present invention, a minimum has been reached when two successive increases, one before and one after a polarity change of the DELTA value, occur. Similarly, a minimum has been reached when a decrease is followed by an increase for a fixed polarity of the DELTA value.

Figure 6:
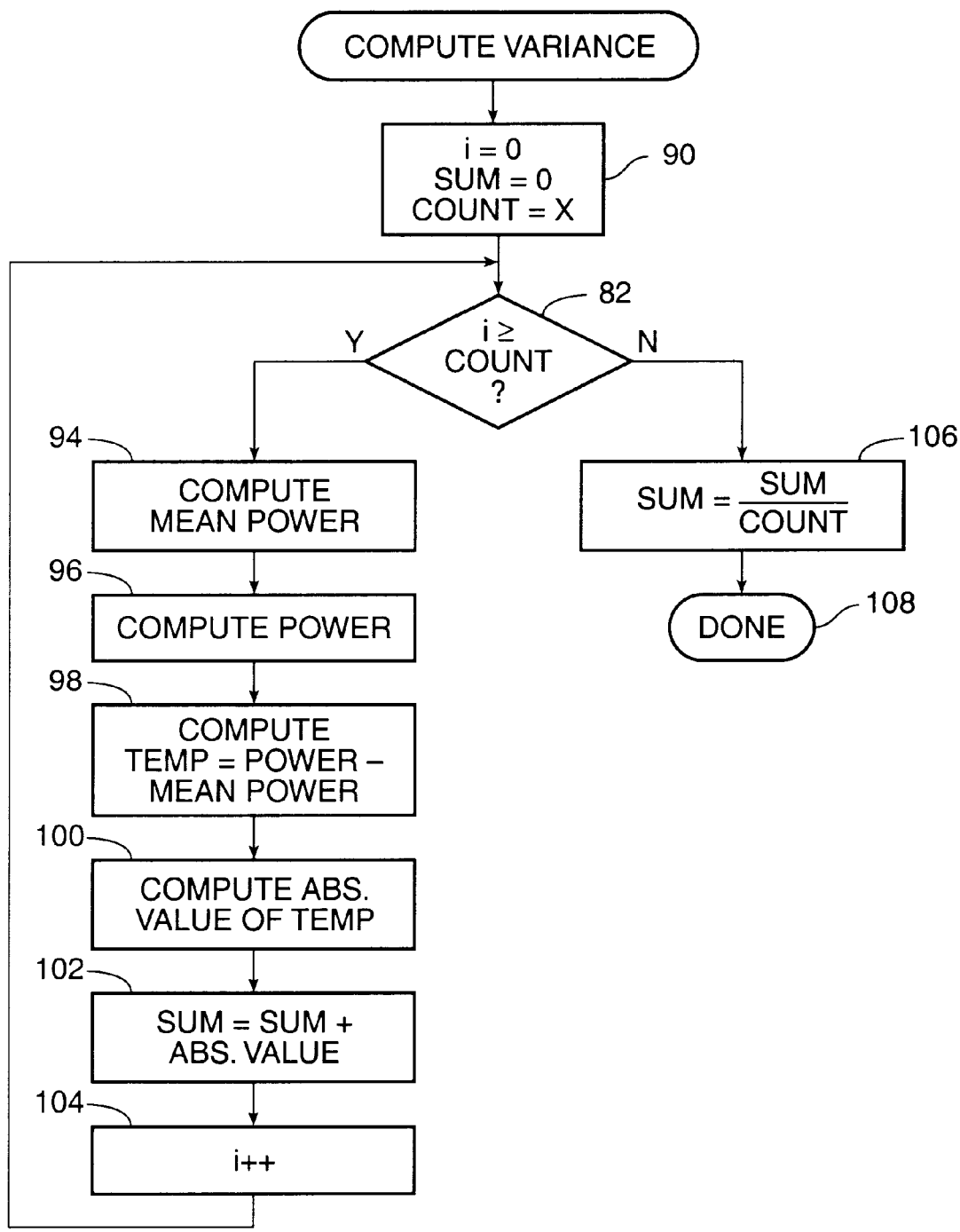
FIG. 6 illustrates a method for computing the variance of the power according to a presently preferred embodiment of the present invention.

Referring now to FIG. 6, a method for computing the variance of the power according to a presently preferred embodiment of the present invention is presented. First, at step 90, counters I, SUM, and COUNT are initialized. According to a presently preferred embodiment of the present invention, the counter I is increased until the total number of points COUNT have been sampled. The total SUM of the power is maintained for all iterations. At step 92, the variance is computed until the total number of points for the corresponding window size, COUNT, have been sampled. Next, at step 94, the mean power is calculated. Next, at step 96, the power is computed for the specified POWER_REFERENCE and AUTOMATIC_GAIN_CONTROL setting using the in-phase and quadrature values obtained from the matched filter outputs. Next, at step 98, the variance may be calculated by subtracting the mean power from the power value calculated in step 96. Next, at step 100, the absolute value of the result of step 98 is obtained. At step 102, the absolute value is added to the total SUM. At step 104, the counter I is incremented. At step 92, if the counter I indicates that the total number of points COUNT have been sampled, the variance is obtained at step 106 by dividing the total SUM by the total number of points sampled, COUNT. The process is completed at step 108. Those of ordinary skill in the art will readily recognize that the above steps are illustrative only and may be performed in an alternate order.

Figure 7:
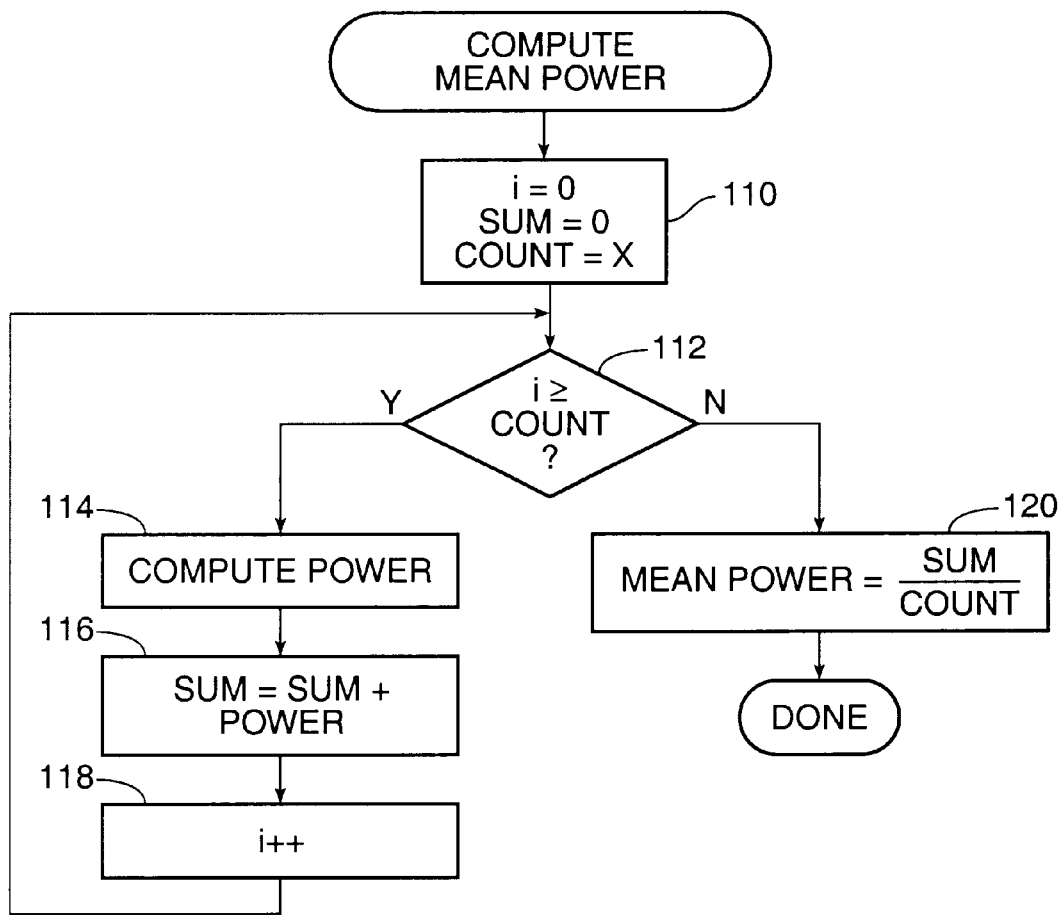
FIG. 7 illustrates a method for computing the mean power according to a presently preferred embodiment of the present invention.

Referring now to FIG. 7, a method for computing the mean power according to a presently preferred embodiment of the present invention is presented. First, at step 110, counters I, SUM, and COUNT are initialized. According to a presently preferred embodiment of the present invention, the counter I is increased until the total number of points for the corresponding window size, COUNT, have been sampled. The total SUM of the power is maintained for all iterations. At step 112, the mean power is computed until the total number of points COUNT have been sampled. At step 114, the power for a specified POWER_REFERENCE and AUTOMATIC_GAIN_CONTROL setting is calculated. According to a presently preferred embodiment, the power is calculated according to the formula I*I+Q*Q(-4*POWER_REFERENCE) where I is the in-phase component and Q is the quadrature component. According to a presently preferred embodiment of the present invention, the in-phase and quadrature signal components are obtained from the matched filter outputs. The mean power may then be computed by adding this value over a number of points at step 116. The counter I is incremented at step 118. When the total number of points COUNT have been sampled, the mean power is calculated at step 120 by dividing the total power, SUM, by the total number of points sampled, COUNT. Those of ordinary skill in the art will readily recognize that the above steps are illustrative only and may be performed in an alternate order.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method for correcting imbalance in in-phase and quadrature components of a modulated received signal, the method comprising:

assuming a signal imbalance exists in the received signal, the signal imbalance having an amplitude imbalance and a phase imbalance;

setting the signal imbalance to an initial value;

generating an amplitude imbalance correction factor and a phase imbalance correction factor to lessen the signal imbalance;

initializing a threshold value to accommodate for inherent fluctuations in the amplitude and the phase; and re-evaluating the amplitude imbalance correction factor and the phase imbalance correction factor over a set of readings of the in-phase and quadrature components until the signal imbalance is minimized, wherein the re-evaluating the amplitude further includes:

reading the in-phase and quadrature signal components at corresponding matched filter outputs;

computing a variance of power corresponding to the in-phase and quadrature signal components;

determining an amplitude delta value;

updating the amplitude imbalance correction factor using the amplitude delta value to produce an updated amplitude imbalance correction factor;

calculating new in-phase and quadrature components using the updated amplitude imbalance correction factor;

computing a new variance of power corresponding to the new in-phase and quadrature components;

determining a change in variance of power defined by a difference between the new variance and the variance; and updating the amplitude imbalance correction factor using the amplitude delta value when the change in variance is greater than or equal to the threshold value.

2. The method according to claim 1, wherein the determining an amplitude delta value further includes:

determining the amplitude delta value as a proportion of the variance of power.

3. The method according to claim 1, wherein the determining an amplitude delta value further includes:

initializing the amplitude delta value as a constant.

4. The method according to claim 1, wherein the re-evaluating the amplitude imbalance correction factor further includes:

reading the in-phase and quadrature signal components at corresponding matched filter outputs;

computing a variance of power corresponding to the in-phase and quadrature signal components;

determining a phase delta value;

updating the phase imbalance correction factor using the phase delta value to produce an updated phase imbalance correction factor;

calculating new in-phase and quadrature components using the updated phase imbalance correction factor;

computing a new variance of power corresponding to the new in-phase and quadrature components;

determining a change in variance of power defined by a difference between the new variance and the variance; and updating the amplitude imbalance correction factor using the phase delta value when the change in variance is greater or equal to the threshold value.

5. The method according to claim 4, wherein the determining a phase delta value further includes:

determining the phase delta value as a proportion of the variance of power.

6. The method according to claim 4, wherein the step of determining a phase delta value further includes:

initializing the phase delta value as a constant.

7. An apparatus for correcting imbalance in in-phase and quadrature components of a modulated received signal, comprising:

means for assuming a signal imbalance exists in the received signal, the signal imbalance having an amplitude imbalance and a phase imbalance;

means for setting the signal imbalance to an initial value;

means for generating an amplitude imbalance correction factor and a phase imbalance correction factor to lessen the signal imbalance;

means for initializing a threshold value to accommodate for inherent fluctuations in the amplitude and the phase; and means for re-evaluating the amplitude imbalance correction factor and phase imbalance correction factor over a set of readings of the in-phase and quadrature components until the signal imbalance is minimized, wherein the means for re-evaluating further includes:

means for reading the in-phase and quadrature signal components at corresponding matched filter outputs;

means for computing a variance of power corresponding to the in-phase and quadrature signal components;

means for determining an amplitude delta value;

means for updating the amplitude imbalance correction factor using the amplitude delta value to produce an updated amplitude imbalance correction factor;

means for calculating new in-phase and quadrature components using the updated amplitude imbalance correction factor;

means for computing a new variance of power corresponding to the new in phase and quadrature components;

means for determining a change in variance of power defined by a difference between the new variance and the variance; and means for updating the amplitude imbalance correction factor using the amplitude delta value when the change in variance of power is greater than or equal to the threshold value.

8. The apparatus according to claim 7, wherein the means for determining an amplitude delta value further includes:

means for determining the amplitude delta value as a proportion of the variance of power.

9. The apparatus according to claim 7, wherein the means for determining an amplitude delta value further includes:

means for initializing the amplitude delta value as a constant.

10. The apparatus according to claim 7, wherein the means for re-evaluating further includes:

means for reading the in-phase and quadrature signal components at corresponding matched filter outputs;

means for computing a variance of power corresponding to the in-phase and quadrature signal components;

means for determining a phase delta value;

means for updating the phase imbalance correction factor using the phase delta value to produce an updated phase imbalance correction factor;

means for calculating new in-phase and quadrature components using the updated phase imbalance correction factor;

means for computing a new variance of power corresponding to the new in phase and quadrature components;

means for determining a change in variance of power defined by a difference between the new variance and the variance; and means for updating the amplitude imbalance correction factor using the phase delta value when the change in variance of power is greater than or equal to the threshold value.

11. The apparatus according to claim 10, wherein the means for determining a phase delta value further includes:

means for determining the phase delta value as a proportion of the variance of power.

12. The apparatus according to claim 10, wherein the means for determining a phase delta value further includes:

means for initializing the phase delta value as a constant.

* * * * *